(12) United States Patent
Miyamoto

(10) Patent No.: US 8,111,597 B2
(45) Date of Patent: Feb. 7, 2012

(54) DATA RECORDING APPARATUS

(75) Inventor: Takashi Miyamoto, Nishitokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1164 days.

(21) Appl. No.: 11/855,898

(22) Filed: Sep. 14, 2007

(65) Prior Publication Data

US 2008/0205213 A1    Aug. 28, 2008

(30) Foreign Application Priority Data

Sep. 28, 2006    (JP) ................................. 2006-265174

(51) Int. Cl.
G11B 20/10    (2006.01)

(52) U.S. Cl. .................. 369/47.27; 369/59.25; 369/47.1

(58) Field of Classification Search ............... 369/53.18, 369/53.28, 111, 30.09, 59.25, 44.13, 44.39, 369/47.27; 711/111, 154; 715/201
See application file for complete search history.

(56) References Cited

U.S. PATENT DOCUMENTS

| | | | | |
|---|---|---|---|---|
| 6,009,058 A | * | 12/1999 | Sims et al. | 369/53.28 |
| 6,115,346 A | * | 9/2000 | Sims, III | 369/111 |
| 6,134,204 A | * | 10/2000 | Taugher | 369/59.25 |
| 6,172,955 B1 | | 1/2001 | Hashimoto | |
| 6,760,288 B2 | * | 7/2004 | Ijtsma et al. | 369/53.18 |
| 6,785,213 B2 | | 8/2004 | Shishido | |
| 7,114,028 B1 | * | 9/2006 | Green et al. | 711/111 |
| 7,177,990 B1 | * | 2/2007 | Kahn et al. | 711/154 |
| 7,366,975 B1 | * | 4/2008 | Lipton | 715/201 |
| 7,496,017 B2 | | 2/2009 | Brondijk | |
| 2002/0136137 A1 | | 9/2002 | Shishido et al. | |
| 2007/0047398 A1 | * | 3/2007 | Yamamoto et al. | 369/30.09 |

FOREIGN PATENT DOCUMENTS

| | | |
|---|---|---|
| CN | 1321980 A | 11/2001 |
| EP | 0878799 A2 | 11/1998 |
| EP | 0899735 A2 | 3/1999 |
| JP | 11-134799 A | 5/1999 |
| JP | 2001076421 A | 3/2001 |
| JP | 2003-85944 A | 3/2003 |
| JP | 2003-162868 A | 6/2003 |
| JP | 2004171647 A | 6/2004 |
| WO | 2004100159 A1 | 11/2004 |

OTHER PUBLICATIONS

Office Action for corresponding Japanese Application No. 2006-265174, mailed Nov. 30, 2010, with partial translation, 4 pages.
First Office Action (CN) mailed Jun. 19, 2009, issued in corresponding Chinese Application No. 200710142604.X.
European Search Report for Corresponding European Application No. EP 07116056.8, dated Mar. 9, 2011, 6 pages.
Notice of Grounds for Rejection, for corresponding Japanese Application No. 2006-265174, mailed Nov. 1, 2011, 4 pages. (with partial English translation).

* cited by examiner

Primary Examiner — Thuy Pardo
(74) Attorney, Agent, or Firm — Seed IP Law Group PLLC

(57) ABSTRACT

When a blank DVD-RW disk is loaded into an optical disk drive, a host computer issues a FORMAT command to the disk drive. The optical disk drive having received the command performs quick formatting pursuant to a standard. Subsequently, the host computer issues a WRITE command to the optical disk drive in an idle time thereof, thereby instructing recording of dummy data. Consequently, an advantage analogous to that yielded as a result of background formatting of a DVD+RW disk is yielded, and the entirety of the DVD-RW disk can be formatted readily.

9 Claims, 4 Drawing Sheets

DATA RECORDING APPARATUS

PRIORITY INFORMATION

This application claims priority to Japanese Patent Application No. 2006-265174 filed on Sep. 28, 2006, which is incorporated herein by reference in its entirety.

BACKGROUND

1. Technical Field

The present invention relates to a data recording apparatus for recording data in an optical disk for which a simple format is specified as a formatting scheme by a standard.

2. Related Art

A data recording apparatus for recording data in an optical disk usually has an optical disk drive and a host computer for controlling driving of the optical disk drive. An optical disk drive to be loaded into a data recording apparatus is supplied from various manufacturers. A formatting scheme is standardized according to the type of an optical disk in order to enable smooth drive control even in the case of use of an optical disk drive supplied from any of the manufacturers. Each of the optical disk drives is usually set so as to operate in compliance with this standard.

For instance, a background format is specified by the standard as a formatting scheme of a DVD+RW disk. As described in JP 11-134799 A and JP 2003-162868 A, the background format is a format scheme for automatically performing formatting operation during an idle time of the disk drive during which recording or reproduction of data into or from the optical disk is not performed. The optical disk drive designed pursuant to the standard is arranged so as to automatically perform background formatting operation when formatting is instructed by the host computer while a DVD+RW disk remains loaded.

In the meantime, the DVD-RW disk is specified, by the standard, so as to use a formatting scheme called quick formatting. Quick formatting is a formatting scheme for formatting only areas required to enable packet writing; specifically, a lead-in area, a lead-out area, and a head of a user area. The head of the user area is an area where a file system is to be recorded. The other area which has not been formatted by means of quick formatting is formatted, on an as needed basis, every time there arises a necessity to record data. Such quick formatting enables initiation of recording of data within a considerably-short period of time when compared with a case where the entire surface of the disk is formatted.

Incidentally, in the case of the DVD-RW disk employing quick formatting, an optical disk in principle remains open unless otherwise closing of a session is instructed by a user. Such an optical disk remaining in an open state cannot read data by means of another device, such as a personal computer (hereinafter abbreviated as "PC"). In order to read the data recorded in the optical disk by means of another device, such as a PC, temporary close of a session of the optical disk or installation of packet write software into another device, such as a PC, is required. However, the former case requires operation for the user instructing session close processing anew which is different from that required in the case of the DVD+RW disk, thereby raising a problem of creation of confusion of the user. When session close processing is performed, only the area formatted at that point in time can be utilized, which in turn raises a problem of inability to effectively utilize the data capacity of the DVD-RW disk. Moreover, when packet write software is installed, installing operation is complicated, and there is a potential of the stability of operation of an operating system being deteriorated by the new software, as well.

Specifically, quick formatting enables shortening of a time that elapses before commencement of recording of data, but suffers a problem of a low degree of compatibility with another device.

SUMMARY

Accordingly, the present invention provides a data recording apparatus capable of recording data into an optical disk—for which quick formatting is specified as a formatting scheme by a standard—with enhanced compatibility with another device.

A data recording apparatus of the present invention is a data recording apparatus for recording data into an optical disk for which quick formatting is specified as a formatting scheme by a standard, the apparatus comprising:

an optical disk drive which performs formatting of the optical disk and recording and reproduction of data into and from the optical disk in accordance with the scheme specified by the standard; and a control section which controls the optical disk drive in accordance with an instruction from a user, wherein the control section sequentially instructs the optical disk drive to record dummy data in an idle time during which the optical disk is not subjected to processing instructed by the user.

In a preferred mode, when the optical disk remains in a session-open state after having undergone quick formatting, the control section ascertains whether or not recording of the dummy data in an entirety of the optical disk has been completed; and, when recording of dummy data has been completed, the control section automatically instructs the disk drive to perform session close processing.

In another preferred mode, the control section instructs recording of the dummy data by issuing an actual data recording command which is issued to the optical disk drive at the time of instruction of data recording.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

Figure 1:
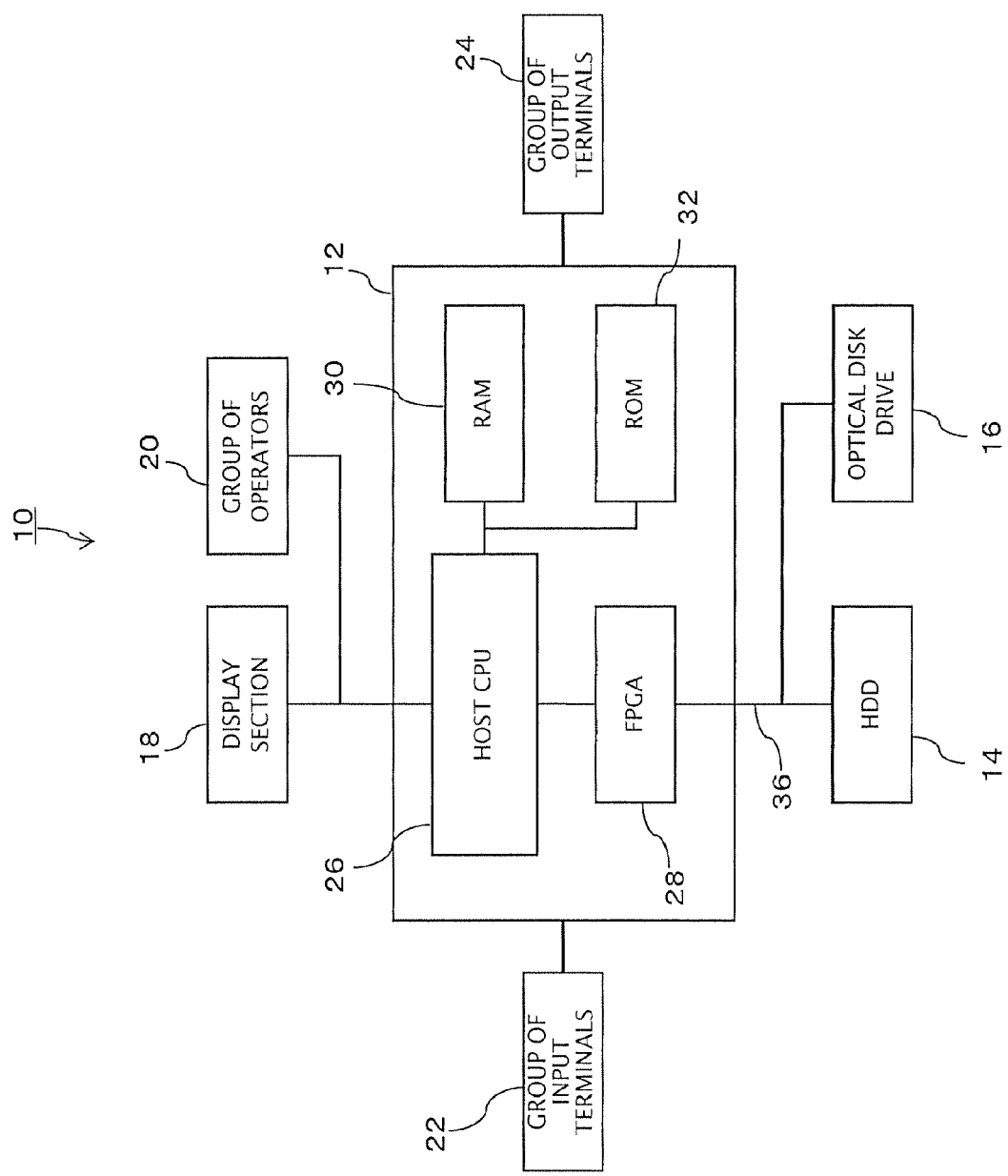
FIG. 1 is a block diagram of a data recording apparatus which is an embodiment of the present invention.

An embodiment of the present invention will be described hereunder by reference to the drawings. FIG. 1 is a block diagram of a data recording apparatus 10 which is an embodiment of the present invention. This data recording apparatus 10 is a device that records sound data and image data input from the outside by way of a group of input terminals 22 into a hard disk drive or an optical disk in high resolution. Further, the data recording apparatus 10 can also output the sound data and the image data recorded in the recording medium to the outside by way of the group of output terminals 24. The data recording apparatus 10 has a hard disk drive (hereinafter abbreviated as an "HDD") 14 and an optical disk drive 16 as a recording drive which records and reproduces data into and from a recording medium.

As is well known, the HDD 14 is a recording drive which records and reproduces information into and from a disc coated with a magnetic substance by use of a magnetic head. This HDD 14 is connected to a host computer 12, which will be described later, by way of an ATAPI bus 36.

The optical disk drive 16 is a recording drive which records information in an optical disk by utilization of a laser beam. As is the case with many optical disk drives which are now in circulation through the market, the optical disk drive 16 can handle a plurality of types of optical disks; specifically, a DVD-RW disk, a DVD+RW disk, and the like. A formatting scheme of the optical disk has been specified in advance by a standard according to the type of the optical disk. The optical disk drive 16 of the present embodiment is designed so as to operation pursuant to the standard conforming to the type of a loaded optical disk.

A command from the user is input by way of a group of operators 20 including a plurality of buttons, dials, and the like. The user instruction input by way of the group of operators 20 is input to the host computer 12. The host computer 12 interprets the input user instruction and performs driving responsive to the instruction. Moreover, this data recording apparatus 10 also has a display section 18 for displaying to the user various types of information; for example, a progress in processing and an inquiry about the user. The display section 18 is formed from; e.g., an LCD, and driving of the display section 18 is controlled by means of the host computer 12.

The group of input terminals 22 and the group of output terminals 24 include a plurality of terminals for use in exchanging data with other external devices. In the present embodiment, a plurality of types of terminals are provided in order to enable establishment of a connection with various types of external devices.

The host computer 12 acts as control means for controlling respective sections of the data recording apparatus 10. This host computer 12 has a host CPU 26, FPGA 28, RAM 30, ROM 32, and others. The host CPU 26 is an IC which executes arithmetic operation in accordance with a program previously stored in the ROM 32. Background formatting of a DVD-RW disk, which will be described later, is controlled and performed by this host CPU 26. The FPGA 28 is an LSI acting as a gate array which enables the user to write a unique logic circuit. This FPGA 28 outputs the instruction output from the host CPU 26 to the respective sections. The RAM 30 acts as so-called work memory and temporarily stores information required to perform various types of arithmetic operations.

This host computer 12 and the HDD 14 are connected by means of the ATAPI bus 36, and the host computer 12 and the optical disk drive 16 are also connected by means of the same. As is well known, ATAPI is a type of interface for connecting a computer to a device. Several commands are prepared for ATAPI, and transmission and receipt of an instruction between devices are performed by use of this command. The types of commands include; for example, a WRITE command for instructing recording of data, an FORMAT command for instructing formatting operation, and a CloseSession command for instructing session close processing. Driving operations corresponding to the respective commands are set in advance in a recording device which receives these commands from the host computer 12.

Processing for recording data into the optical disk by means of this data recording apparatus 10 will now be described. First, a brief explanation is given to formatting schemes for two types of optical disks which can be handled by this data recording apparatus 10; namely, a DVD+RW disk and a DVD-RW disk.

A formatting scheme called background formatting is adopted for a DVD+RW disk. Background formatting is a scheme for sequentially performing formatting operation by utilization of an idle time during which recording or reproduction of data is not performed. Since formatting operation is automatically performed sequentially by utilization of the idle time, the entire surface of the optical disk is automatically formatted in the end.

Figure 2:
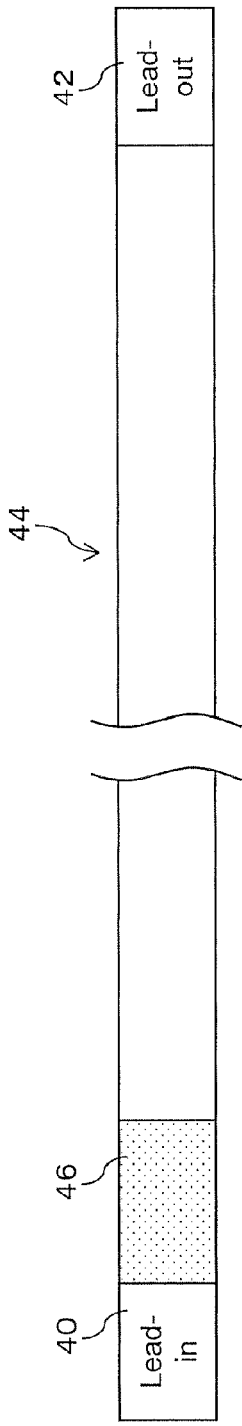
FIG. 2 is a view showing the manner of quick formatting.

In the meantime, a formatting scheme called quick formatting is adopted for the DVD-RW disk. FIG. 2 is a view showing the concept of quick formatting. As is well known, a lead-in area 40 is set in the head of the DVD-RW disk, and a lead-out area 42 is set in the end of the same. An area between the lead-in area 40 and the lead-out area 42 serves as a user area 44 where the user can freely record data. When data are recorded in the user area 44, the user area 44 must be formatted in advance.

Here, quick formatting refers to a scheme for formatting only the lead-in area 40, the lead-out area 42, and a head 46 of the user area 44. After the DVD-RW disk has been subjected to quick formatting, only a storage space required to record the data is formatted every time an instruction to record data is issued. At this time, the DVD-RW disk is in an open state where predetermined data are not recorded in both the lead-in area 40 and the lead-out area 42. Consequently, in order to read the data recorded in the DVD-RW disk are read by means of another device; e.g., a PC, the user must issue an instruction to close a session anew.

In the case of quick formatting, the amount of data to be formatted becomes considerably smaller when compared with the case where the entirety of the DVD-RW disk is formatted. Hence, recording of data can be commenced within a very short period of time. In the meantime, the quick-formatted DVD-RW disk suffers a problem of a low degree of compatibility with a device, such as a PC equipped with an UDF file system. Moreover, the user must issue an instruction for processing which is not available in the DVD+RW disk; that is, session close processing, which is incident to create confusion of the user. Further, when close processing is performed in the midstream of formatting of the DVD-RW disk, only storage capacity of the formatted area is available, and the storage capacity of the optical disk cannot be utilized effectively.

Accordingly, in the present embodiment, in order to enhance compatibility with the UDF file system while the host computer makes up for an operation difference attributable to a difference between the types of disks, there is performed format processing differing from conventional formatting in terms of a scheme. Specifically, in the present embodiment, the host computer sequentially issues an instruction to record dummy data into the DVD-RW disk in an idle time during which recording and reproduction of data into and from the DVD-RW disk is not performed. Thus, operation analogous to operation achieved during background formatting of the DVD+RW disk is performed.

Figure 3:
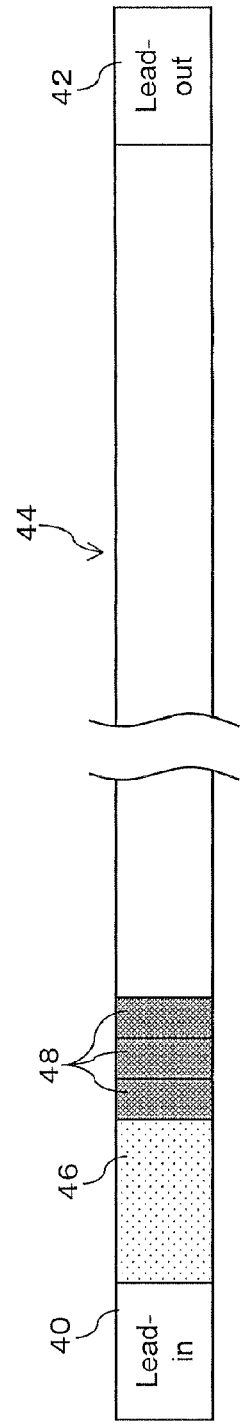
FIG. 3 is a view showing the manner of background formatting a DVD-RW disk in the present embodiment.
Figure 4:
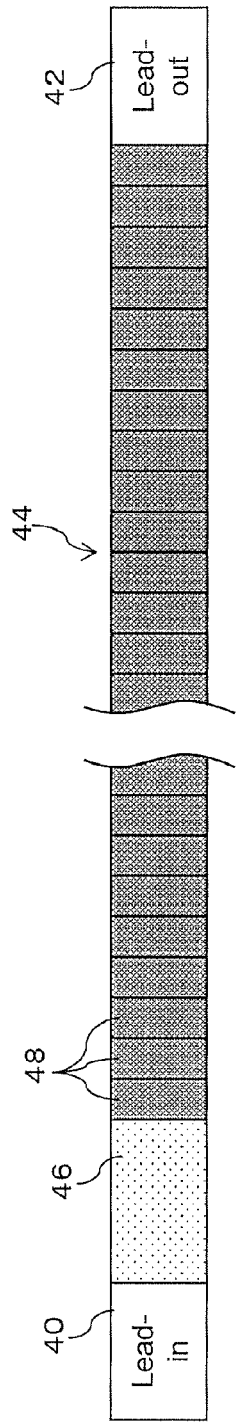
FIG. 4 is a view showing the manner of completion of background formatting of the DVD-RW disk in the present embodiment.

FIGS. 3 and 4 are conceptual renderings showing the manner of background formatting. As shown in FIG. 2, the DVD-RW disk achieved at a point in time when quick formatting has been completed is in a state where only the head of the user area is formatted. In this state, the DVD-RW disk remains in an open state. When quick formatting is completed, the host computer 12 determines whether or not the optical disk drive is in the middle of recording or reproducing data. When having determined the current time as an idle time—during which neither data recording nor data reproduction is being performed—, the host computer 12 issues a WRITE command, to thus instruct the optical disk drive 16 to record dummy data. Specifically, as shown in FIG. 3, data 48 of a predetermined unit (the unit of a data length can be set arbitrarily); that is, dummy data 48 of length 1000$h$, are recorded in the user area of the DVD-RW disk in the present embodiment. The unit of the data length may also be a pack unit. When the dummy data are sequentially written up to the end of the user area 44, as shown in FIG. 4, as a result of recording of the dummy data 48, the DVD-RW disk is brought into the same state as that achieved when the entirety of the DVD-RW disk is formatted. When the DVD-RW disk has entered this state, the host computer 12 instructs the optical disk drive 16 to automatically perform close session processing without receipt of an instruction from the user. The optical disk drive having received the instruction records predetermined data compliant with the standard into the lead-in area and the lead-out area.

According to the flow of processing mentioned above, the DVD-RW disk for which quick formatting is specified is subjected to processing analogous to background formatting of the DVD+RW disk. Consequently, compatibility of the DVD-RW disk with the UDF file system can be enhanced. Moreover, the host computer automatically issues an instruction for cession close processing, and hence there is obviated a necessity for the user to issue an instruction for session close processing anew. Thus, the difference between operation for the case of the DVD+RW disk and operation for the case of the DVD-RW disk can be eliminated, whereupon confusion of the user can be diminished.

Moreover, background formatting of the DVD-RW disk eventually leads to a result analogous to that yielded as a result of background formatting of the DVD+RW disk. However, the optical disk drive 16 handles background formatting as ordinary actual data recording. Specifically, recording of dummy data is not automatically performed by the optical disk drive 16 but carried out in accordance with the WRITE command issued by the host computer 12. Consequently, even when the optical disk drive 16 is one which is not set so as to perform background formatting of a DVD-RW disk; in other words, even when the optical disk drive 16 is one designed in accordance with ordinary standards, the optical disk drive can perform background formatting of a DVD-RW disk. Consequently, there can be embodied a data recording apparatus capable of recording data in a DVD-RW disk while the inexpensive optical disk drive 16—which is in circulation, in large quantity, through the market—is used; in other words, while a reduction in the total cost of the data recording apparatus and high compatibility with a device, such as a PC equipped with an UDF file system, are achieved.

Figure 5:
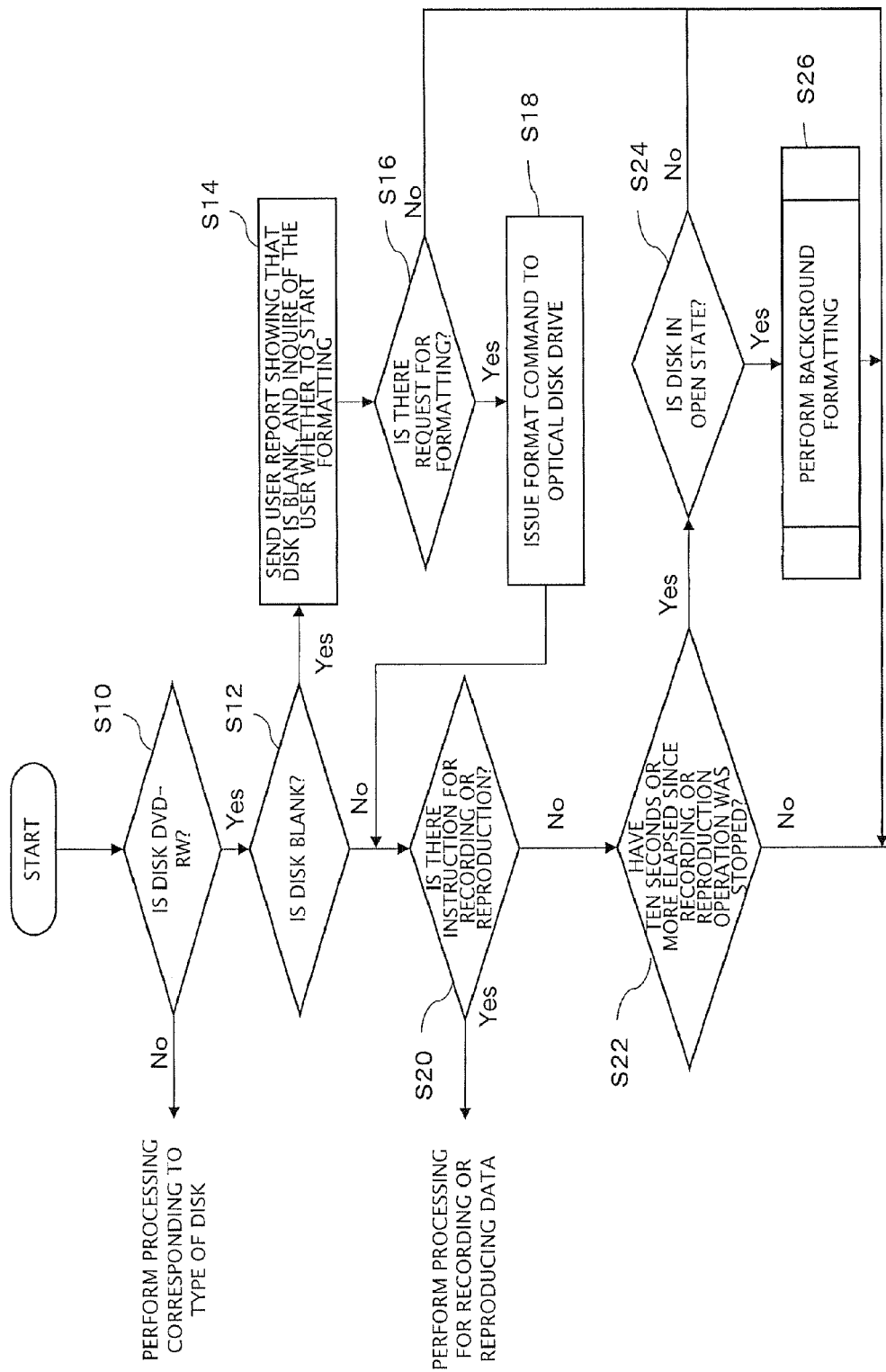
FIG. 5 is a flowchart showing the flow of recording of data in the DVD-RW disk.

Flow of recording of data in this DVD-RW disk will now be described. FIG. 5 is a flowchart showing the flow of recording of data into a DVD-RW disk performed by the data recording apparatus 10 of the present embodiment.

When an optical disk is loaded into the optical disk drive 16, loading of the disk is reported to the host computer 12 by the optical disk 16. This report is issued by use of a command specified by an ATA/ATAPI. The host computer 12 having received the report about loading of the disk determines the type of the loaded disk (S10). When the loaded disk is of type other than the DVD-RW disk, processing proceeds along the same flow as that adopted in the related art, and hence its explanation is omitted here.

In the meantime, when the loaded disk is the DVD-RW disk, the host computer 12 then determines whether or not the disk is blank (S12). This determination is also rendered in accordance with the information reported by the optical disk drive 16 by way of the ATAPI.

When the result of the determination shows that the disk is blank, the host computer 12 causes the display section 18 to display that the disk is blank. Moreover, the display section 18 is also caused to display an inquiry intended for the user as to whether to start formatting (S14).

When the user who viewed the indication on the display section 18 has issued an instruction not to perform formatting (S16), the host computer 12 completes processing of the DVD-RW disk. In the meantime, when the user has input an instruction to perform formatting (S16), the host computer 12 issues a FORMAT command to the optical disk drive 16 (S18). The optical disk drive 16 having received this command starts formatting in accordance with the previously-specified standard. As mentioned previously, in the case of the DVD-RW disk, quick formatting is specified as the formatting scheme. Consequently, when the FORMAT command has been issued to the optical disk drive 16 in which the DVD-RW disk is loaded, the optical disk drive 16 subjects the DVD-RW disk to quick formatting. Specifically, the optical disk drive 16 formats only the lead-in area, the lead-out area, and the head of the user area. After completion of quick formatting, processing proceeds to step S20 to be described later. Alternatively, it may also be possible to enable selection of, as the formatting scheme for the DVD-RW disk, conventional entire formatting other than quick formatting. When entire formatting is selected in step S16 in the case where the formatting scheme is made selectable, a FORMAT command for formatting the entirety of the disk is issued in step S18, and the entirety of the DVD-RW disk is formatted. After completion of entire formatting, session close processing is performed.

Turning back to step S12, there will now be described the case where the loaded disk is not blank. When the loaded optical disk is not blank, the host computer 12 ascertains whether or not the user has issued an instruction concerning recording or reproduction of data into or from the disk (S20). When the instruction about recording or reproduction of data has been issued by the user, the instruction is executed by priority. Processing pertaining to recording or reproduction of data is the same as that performed in the related art, and hence its detailed explanation is omitted.

When the instruction about recording or reproduction of data has not been issued, the host computer determines whether or not a predetermined period of time; ten seconds in the present embodiment, has elapsed since the optical disk drive 16 stopped recording or reproducing operation (S22). When recording or reproduction of data is not performed for ten seconds or more, the host computer 12 further determines whether or not the loaded optical disk is in an open state (S24).

When the result of the determination shows that the optical disk is in a closed state, processing ends immediately. In the meantime, when the optical disk is in the open state, foregoing background formatting; namely, sequential recording of dummy data, is performed (S26).

Figure 6:
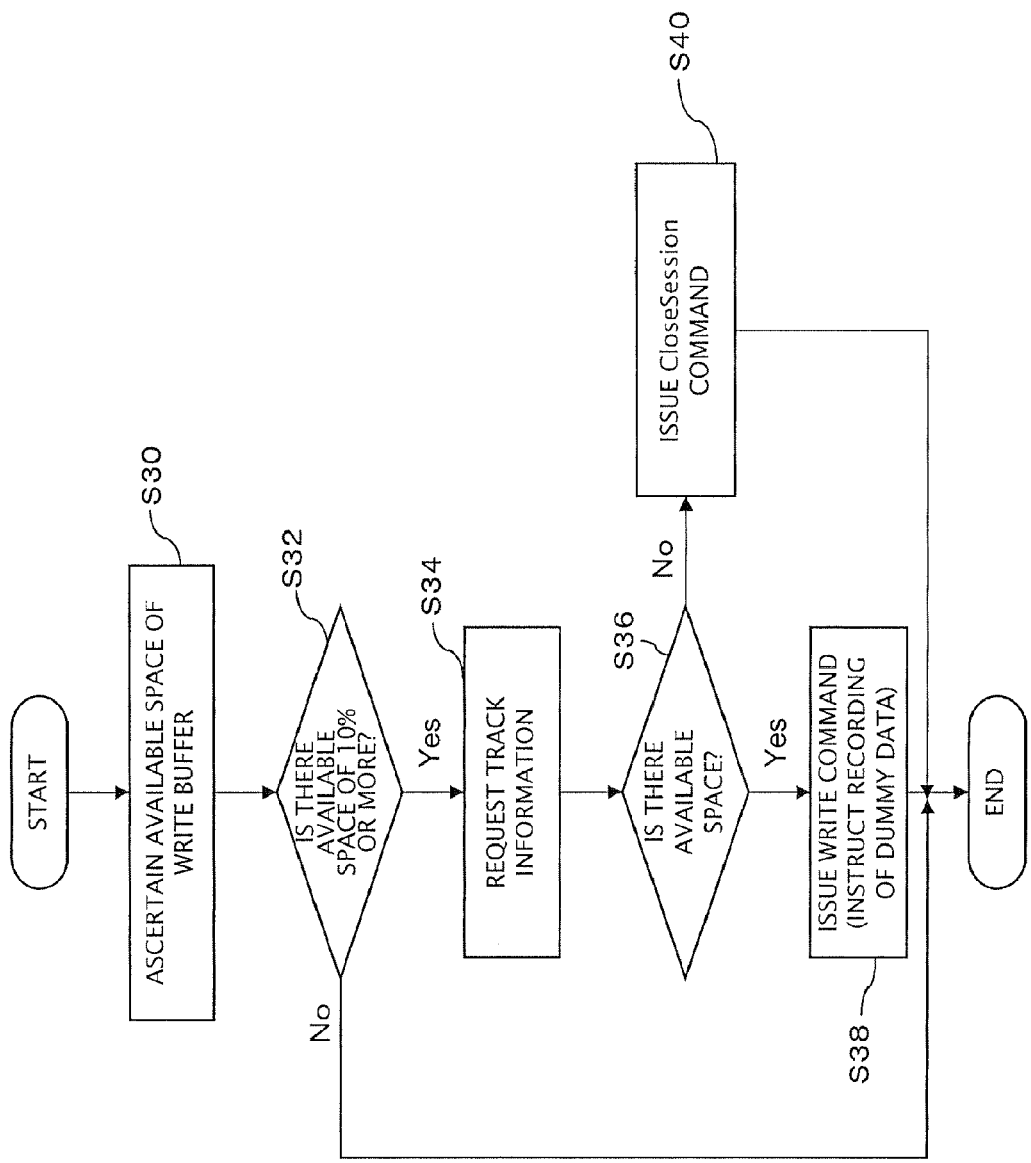
FIG. 6 is a flowchart showing the flow of background formatting of the DVD-RW disk.

FIG. 6 is a flowchart showing the detailed flow of background formatting (S26) of the DVD-RW disk. The host computer 12 first confirms an available space of a write buffer of the optical disk drive 16 (S30). More specifically, the host computer 12 transmits to the optical disk drive 16 an ATAPI command for ascertaining the storage space of the write buffer. The optical disk drive 16 having received this command returns to the host computer 12 the space of the write buffer that is available at this point in time. In accordance with the result of the reply, the host computer 12 determines whether or not the available space of the write buffer is equal to or greater than a predetermined requirement (which can be set arbitrarily); that is, 10% or more in the present embodiment (S32). When the result of the determination shows that the available space of the write buffer is less than 10%, the host computer determines that recording of dummy data to be described later is impossible, and then terminates processing.

In the meantime, when the available space of the write buffer is equal to or greater than the predetermined requirement, the host computer 12 requests track information from the optical disk drive 16 (S34). The track information includes formatted regions in the user area; in other words, information about whether or not dummy data are recorded.

In accordance with this track information, the host computer 12 determines whether or not an available space is in the optical disk (S36). On consequently determining that data are recorded over the entire surface of the optical disk, the host computer 12 issues a CloseSession command to the optical disk drive 16 (S40). The optical disk drive 16 having received this command performs session close processing for writing predetermined information into the lead-in area and the lead-out area. At this time, the entire surface of the optical disk (DVD-RW) remains formatted, and the session remains closed. Consequently, even another device adopting a UDF file system; for example, a PC, can read the data recorded in the optical disk, and the entirety of the optical disk is available.

When an unformatted area still exists in the optical disk drive 16, the host computer 12 interprets the track information and then acquires an address showing a location where the dummy data are to be recorded. In order to record dummy data of a predetermined unit in the address, a WRITE command is issued to the optical disk drive 16 (S38). The optical disk drive 16 having received that command records dummy data of a predetermined unit into the designated address position on the optical disk. For the optical disk drive 16, recording of the dummy data is the same as ordinary processing for recording actual data. However, recording of dummy data becomes essentially equal to operation for formatting an optical disk. Specifically, in the present embodiment, the DVD-RW disk is subjected to background formatting which is not specified by the standard, by use of the WRITE command that is a ATAPI standard command.

When recording of the dummy data is completed, processing returns to step S24 shown in FIG. 5. In subsequent processes, processing pertaining to steps S24 to S26 is iterated. When the user has instructed recording or reproducing of data during the course of iteration of processing, recording or reproducing operation is performed by priority.

As is apparent from the above descriptions, according to the present embodiment, the dummy data are sequentially recorded in an automatic manner without a special instruction from the user. In consequence, the DVD-RW disk becomes sequentially formatted in an automatic manner. Further, sequential formatting is performed by use of the WRITE command employed during ordinary operation for recording actual data. Therefore, the optical disk drive 16 handles this sequential formatting operation as ordinary operation for recording actual data. Put another way, sequential formatting becomes possible without addition of any design modifications to the disk drive designed in compliance with the standard. Consequently, there can be acquired a data recording apparatus capable of background formatting a DVD-RW disk by utilization of an inexpensive optical disk drive which is easy to obtain. As a result of background formatting being enabled, a DVD-RW disk which is easily handled by another device can be created without imposing a special burden on the user.

In the present embodiment, in addition to including the optical disk drive 16, the recording apparatus also has the HDD 14 as a recording drive. This HDD 14 is also controllably driven by means of exchanging various commands with the host computer by way of the ATAPI bus. Since the host computer 12 of the present embodiment has a single channel for ATAPI purpose, the host computer 12 cannot exchange commands with respect to the optical disk drive 16 in the middle of exchanging a command with respect to the HDD 14 by way of the ATAPI bus. Therefore, previously-described background formatting of the DVD-RW (recording of dummy data in reality) is naturally aborted even when a command is being exchanged with the HDD 14 as well as when data are being recorded or reproduced into or from the optical disk. However, as a matter of course, when the host computer 12 is provided with a plurality of channels for ATAPI purpose, the host computer can perform background formatting in the process of exchanging commands with the HDD 14. Moreover, when long-duration exchange of commands with the HDD 14 is known beforehand, the optical disk drive 16 may first be instructed, in advance, to record a comparatively large amount of dummy data into the DVD-RW disk. Subsequently, exchange of commands with the HDD 14 may also be started after completion of that command. Such a configuration enables recording of dummy data into the DVD-RW disk (i.e., background formatting) while exchange of commands with the HDD 14 is being performed. Thus, a time required to perform entire formatting can be shortened.

What is claimed is:

1. A data recording apparatus for recording data into an optical disk for which quick formatting is specified as a formatting scheme by a standard, the quick formatting being so specified as to format only a lead-in area, a lead-out area, and a head of a user area of the optical disk, the apparatus comprising:

an optical disk drive which performs formatting of the optical disk and recording and reproduction of data into and from the optical disk in accordance with the scheme specified by the standard; and a control section which controls the optical disk drive in accordance with an instruction from a user, wherein the control section instructs the optical disk drive to execute the quick formatting for the optical disk by issuing a formatting command based on the instruction from the user when the optical disk is loaded, and sequentially instructs the optical disk drive to record dummy data in an unformatted area of the optical disk in an idle time, during which the optical disk is not subjected to processing instructions by the user, by issuing an actual data recording command to the optical disk drive at the time of instruction of data recording.

2. The data recording apparatus according to claim 1, wherein, when the optical disk remains in a session-open state after having undergone quick formatting, the control section ascertains whether or not recording of dummy data in an entirety of the optical disk has been completed; and, when recording of the dummy data has been completed, the control section automatically instructs the disk drive to perform session close processing.

3. The data recording apparatus according to claim 1, wherein the optical disk is a DVD-RW disk.

4. The data recording apparatus according to claim 1, wherein the control section sequentially instructs the optical disk drive to record dummy data until recording of dummy data in an entirety of the optical disk has been completed.

5. A method of recording data in an optical disk for which quick formatting is specified as formatting scheme by a standard, the method comprising:

determining that a loaded optical disk is an optical disk for which quick formatting is specified as formatting scheme by a standard, quick-formatting a lead-in area, a lead-out area, and a head of a user area of the determined optical disk, and recording dummy data in an area other than the quick-formatted areas of the determined optical disk in an idle time, during which the optical disk is not subjected to processing based on instructions by a user, based on an actual data recording command that is issued to the optical disk drive at the time of instruction of data recording.

6. The method according to claim 5, further comprising:

determining whether or not recording of dummy data in an entirety of the determined optical disk has been completed, and if so determined, automatically performing session close processing on the determined optical disk.

7. The method according to claim 5, wherein the determined optical disk is a DVD-RW disk.

8. The method according to claim 5, further comprising:

determining that a loaded optical disk is an optical disk for which background formatting is specified as formatting scheme by a standard, background-formatting the optical disk determined to be an optical disk for which background formatting is specified.

9. The method according to claim 8, wherein the optical disk determined to be an optical disk for which background formatting is specified is a DVD+RW disk.

* * * * *